United States Patent
Kim et al.

(10) Patent No.: US 9,452,939 B2
(45) Date of Patent: Sep. 27, 2016

(54) HIGH-CAPACITY ANODE MATERIAL FOR LITHIUM SECONDARY BATTERIES AND PROCESS FOR SYNTHESIZING THE SAME

(75) Inventors: Jae Kook Kim, Gwangju (KR); Chul Hong Woo, Jeollanam-do (KR); Eun Seok Choi, Gwangju (KR); Jin Sub Lim, Gwangju (KR); Dong Han Kim, Gwangju (KR); Seung Ho Ahn, Gyeonggi-do (KR)

(73) Assignees: Hyundai Motor Company, Seoul (KR); Industry Foundation of Chonnam National University, Gwangju (KR)

( * ) Notice: Subject to any disclaimer, the term of this patent is extended or adjusted under 35 U.S.C. 154(b) by 1021 days.

(21) Appl. No.: 12/777,545

(22) Filed: May 11, 2010

(65) Prior Publication Data
US 2011/0135564 A1 Jun. 9, 2011

(30) Foreign Application Priority Data

Dec. 3, 2009 (KR) ........................ 10-2009-0118971

(51) Int. Cl.
*C01G 23/00* (2006.01)
(52) U.S. Cl.
CPC ......... *C01G 23/005* (2013.01); *C01P 2002/72* (2013.01); *C01P 2006/40* (2013.01)
(58) Field of Classification Search
CPC .................................................. C01G 23/005
USPC ..................... 423/598, 594.15; 977/700, 773
See application file for complete search history.

(56) References Cited

U.S. PATENT DOCUMENTS

2007/0009800 A1 1/2007 Barker et al.
2009/0186275 A1* 7/2009 Exnar et al. ................. 429/220

FOREIGN PATENT DOCUMENTS

| JP | 10-139430 A | 5/1998 |
|---|---|---|
| JP | 2002-324551 A | 11/2002 |
| KR | 10-2007-0048675 A | 5/2007 |
| KR | 10-0774263 | 11/2007 |

OTHER PUBLICATIONS

Tang et al., Preparation and electrochemical lithium storage of flower-like spinel Li4Ti5O12 consisting of nanosheets, 2008, Electrochemistry Communications, 10, 1513-1516.*
Fattakhova et al., Solvothermal synthesis and electrochemical behavior of nanocrystalline cubic Li—Ti—O oxides with cationic disorder, 2005, Solid State Ionics, 176, 1877-1885.*
Kim et al., "Polyol-mediated synthesis of Li4Ti5O12 nanoparticle and its electrochemical properties", Electrochemistry Communications, vol. 7, pp. 1340-1344 (2005).

* cited by examiner

*Primary Examiner* — Matthew E Hoban
*Assistant Examiner* — James Fiorito
(74) *Attorney, Agent, or Firm* — Mintz Levin Cohn Ferris Glovsky and Popeo, P.C.; Peter F. Corless

(57) ABSTRACT

The present invention features a high-capacity anode material for rapidly chargeable and dischargeable lithium secondary batteries, which is composed of $Li_4Ti_5O_{12}$ nanoparticles. The $Li_4Ti_5O_{12}$ nanoparticles of the present invention exhibit excellent crystallinity and high rate capability compared to those synthesized using a conventional polyol process or solid reaction process by converting $Li_4Ti_5O_{12}$, which is a zero-strain insert material spotlighted as an anode active material for lithium secondary batteries, into $Li_4Ti_5O_{12}$, having a high crystalline nanostructure using a solvothermal synthesis process without performing additional heat treatment. The present invention also features methods of, and a method of preparing the high-capacity anode materials described herein.

8 Claims, 6 Drawing Sheets

HIGH-CAPACITY ANODE MATERIAL FOR LITHIUM SECONDARY BATTERIES AND PROCESS FOR SYNTHESIZING THE SAME

CROSS-REFERENCE TO RELATED APPLICATION

This application claims under 35 U.S.C. §119(a) the benefit of Korean Patent Application No. 10-2009-0118971 filed Dec. 3, 2009, the entire contents of which are incorporated herein by reference.

BACKGROUND OF THE INVENTION

1. Field of the Invention

The present invention relates, generally, to a high-capacity anode material for rapidly chargeable and dischargeable lithium secondary batteries, and, more particularly, to an anode material composed of $Li_4Ti_5O_{12}$ which is a transition metal compound having a nanocrystalline structure, and a method of preparing the anode material using a solvothermal synthesis process without performing additional heat treatment.

2. Background Art

Recently, with the rapid advancement of the electronic industry and the information and communications industries, including the mobile communications industry, electronic appliances have been required to become light, thin, short and small. According to these requirements, mobile IT products, such as notebook computers, mobile phones, personal digital assistants (PDAs), digital cameras, camcorders and the like, are widespread, and simultaneously high-performance, high-capacity and high-density small lithium ion batteries are being competitively developed.

Accordingly, various systems have been developed for lithium ion batteries employing graphite as an anode. However, the graphite anode has some disadvantages such as its initial loss of capacity, structural deformation and electrical disconnection.

To circumvent these problems, a class of anode materials called transition metal oxides ($MoO_2$, $SnO_2$, $Ta_2O_5$, NiO, CoO, CuO, FeO and $Li_4Ti_5O_{12}$) have been investigated.

Among these materials, $Li_4Ti_5O_{12}$ is has been acknowledged as an electrode material that has the advantages of a zero-strain insertion material, low cost and non-toxicity.

An exemplary conventional method of synthesizing $Li_4Ti_5O_{12}$ is performed by employing a solid reaction process or a sol-gel process.

However, the conventional method of synthesizing $Li_4Ti_5O_{12}$ using a solid reaction process can be problematic in that, since the reaction is conducted at a high temperature of 800~1000° C., incidental expenses for increasing reaction temperature are increased, and the reaction products do not have a nanostructure. Further, in the conventional method of synthesizing $Li_4Ti_5O_{12}$ using a sol-gel process the reaction must be conducted at a high temperature of 800° C. or more in order to obtain $Li_4Ti_5O_{12}\square$ having a spinel nanostructure, and so production costs are increased, and particles are grown by high-temperature heat treatment.

Accordingly, there remains a need in the art to provide a high-capacity anode material for rapidly chargeable and dischargeable lithium secondary batteries.

The above information disclosed in this the Background section is only for enhancement of understanding of the background of the invention and therefore it may contain information that does not form the prior art that is already known in this country to a person of ordinary skill in the art.

SUMMARY OF THE INVENTION

Accordingly, the present invention features a high-capacity anode material for rapidly chargeable and dischargeable lithium secondary batteries, which is suitably composed of $Li_4Ti_5O_{12}$ nanoparticles. The $Li_4Ti_5O_{12}$ nanoparticles of the present invention preferably exhibit excellent crystallinity and high rate capability compared to those synthesized using a conventional polyol process or solid reaction process, preferably by converting $Li_4Ti_5O_{12}$, which is a zero-strain insert material spotlighted as an anode active material for lithium secondary batteries, into $Li_4Ti_5O_{12}$ having a high crystalline nanostructure using a solvothermal synthesis process without performing additional heat treatment. The invention also features a method of preparing the same.

The present invention preferably provides a method of preparing a high-capacity anode material for a rapidly chargeable and dischargeable lithium secondary battery, wherein the anode material is preferably composed of $Li_4Ti_5O_{12}$ which is a transition metal compound having a nanocrystalline structure, comprising the steps of mixing a titanium compound and a lithium compound with a polyol solvent to form a mixed solution (step 1); putting the mixed solution into a SUS reaction vessel lined with teflon and then reacting the mixed solution at a predetermined temperature to suitably produce a lithium-titanium oxide precipitate (step 2); and washing, filtering and then drying the lithium-titanium oxide precipitate produced in the SUS reaction vessel (step 3).

According to certain preferred embodiments, in step 1, the mixed solution may be suitably formed by dissolving 0.01 mol of LiOH as a lithium compound in 25 mL of diethyleneglyocl (DEG) as a polyol solvent to form a LiOH solution, adding 0.0125 mol of titanium tetra-isopropoxide (TTIP) as a titanium compound to the LiOH solution, and then stirring the LiOH solution for 30 minutes.

According to other certain preferred embodiments, in step 2, the mixed solution formed in step 1 may preferably be put into the SUS reaction vessel lined with teflon and then sealed, and then the sealed SUS reaction vessel may be put into a drying machine to react the mixed solution for 12~24 hours.

According to still other certain preferred embodiments, in step 3, the lithium-titanium oxide precipitate may be washed with acetone and methanol 3~4 times, filtered by a ceramic membrane, and then dried using a vacuum dryer at 120° C.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
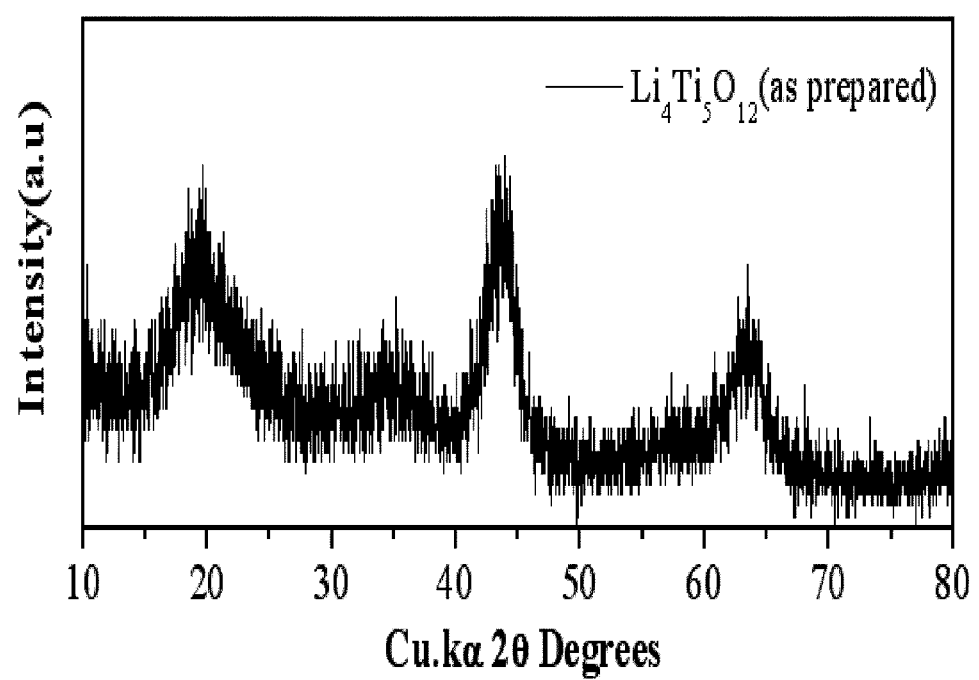
FIG. 1 is a graph showing the X-ray diffraction pattern of dry $Li_4Ti_5O_{12}$ prepared by a solvothermal synthesis process.

As described herein, the present invention includes a method of preparing a high-capacity anode material for a rapidly chargeable and dischargeable lithium secondary battery comprising the steps of mixing a titanium compound and a lithium compound with a polyol solvent to form a mixed solution (step 1), putting the mixed solution into a reaction vessel and reacting the mixed solution at a predetermined temperature to produce a lithium-titanium oxide precipitate (step 2), and washing, filtering and then drying the lithium-titanium oxide precipitate produced in the reaction vessel (step 3).

In one embodiment, the reaction vessel is a SUS reaction vessel lined with Teflon.

In another embodiment, the anode material is composed of a transition metal compound having a nanocrystalline structure.

In another further embodiment, the transition metal compound having a nanocrystalline structure is Li4Ti5O12.

The invention also features a high-capacity anode material for a rapidly chargeable and dischargeable lithium secondary battery, prepared using the method of any one of the aspects described herein.

Hereinafter, preferred embodiments of the present invention will be described in detail with reference to the attached drawings.

According to preferred embodiments, a method of synthesizing a high-capacity anode material for a lithium secondary battery according to the present invention is characterized in that a titanium compound and a lithium compound are preferably mixed with a polyol solvent to form a mixed solution, and then the mixed solution is put into a SUS reaction vessel lined with teflon and then reacted at a predetermined temperature to obtain $Li_4Ti_5O_{12}$ nanoparticles having a nanocrystalline structure.

In preferred embodiments, in the synthesis of a $Li_4Ti_5O_{12}$ electrode material having a nanocrystalline structure, a nanostructured electrode material, that is, the $Li_4Ti_5O_{12}$ nanoparticles are suitably uniformly distributed, have a diameter of about 10 nm and exhibit high rate capability characteristics electrochemically.

A process for synthesizing the $Li_4Ti_5O_{12}$ electrode material, which is a high-capacity anode material for a lithium secondary battery according to preferred embodiments of the present invention, is described in more detail as follows.

In a first preferred embodiment, 25 mL of diethylene glycol (DEG), as a polyol solvent, is put into a beaker, and then 0.01 mol of LiOH, as a lithium compound, is additionally put into the beaker and then dissolved in the diethylene glycol (DEG) to form a LiOH solution.

In a further preferred embodiment, subsequently, 0.0125 mol of titanium tetra-isopropoxide (TTIP), as a titanium compound, is suitably added to the LiOH solution and then stirred for 30 minutes to form a mixed solution.

Subsequently, in a further exemplary embodiment, the mixed solution, in which LiOH as a lithium compound and TTIP as a titanium compound are uniformly dissolved, is preferably put into a SUS reaction vessel lined with teflon and then sealed.

Subsequently, in another further embodiment, the sealed SUS reaction vessel is put into a drying machine set at 220~235° C. and then reacted for 12~24 hours. Preferably, the sealed SUS reaction vessel is put into a drying machine set at 235° C., reacted for 16 hours, and then cooled at room temperature.

Accordingly, a precipitate produced by the reaction, that is, a lithium-titanium oxide precipitate, remains in the SUS reaction vessel. Preferably, this lithium-titanium oxide precipitate is taken out from the SUS reaction vessel, washed with acetone and methanol 3~4 times, filtered by a ceramic membrane, and then dried using a vacuum dryer at 120° C.

As a result, uniform nanostructured $Li_4Ti_5O_{12}$ having a diameter of about 10 nm, which is used to prepare a high-capacity anode material for a lithium secondary battery according to the present invention, can be suitably obtained.

According to preferred exemplary embodiments of the present invention, as a test example, in order to examine the electrochemical characteristics of the $Li_4Ti_5O_{12}$ sample obtained by the above processes, a secondary battery was fabricated using the $Li_4Ti_5O_{12}$ sample, and then its electrochemical characteristics were measured.

Accordingly, in a further related embodiment, 7 mg of the $Li_4Ti_5O_{12}$ as an anode active material of the present invention, 3 mg of carbon black and 5 mg of teflonated acetylene black were suitably mixed and kneaded to form paste, and then the paste was suitably pressed on a SUS mesh, and then the pressed paste is dried in vacuum at 120° C. for 5 hours to form an electrode. Preferably, the electrode was suitably assembled into a half cell using a lithium metal and an electrolyte (a mixture in which ethylene carbonate (EC) containing 1M of $LiPF_6$ and dimethyl carbonate (DMC) are suitably mixed at a ratio of 1:1), and then electrochemical characteristics of the half cell were measured. The results thereof are shown in FIGS. 2 and 3.

According to certain exemplary embodiments, FIG. 1 shows the X-ray diffraction pattern of dry $Li_4Ti_5O_{12}$ suitably prepared by a solvothermal synthesis process without performing heat treatment. Although it has the broaden peaks, all of the peaks are well assigned to the position on the basis of the spinel phase (space group: Fd-3m).

Figure 2:
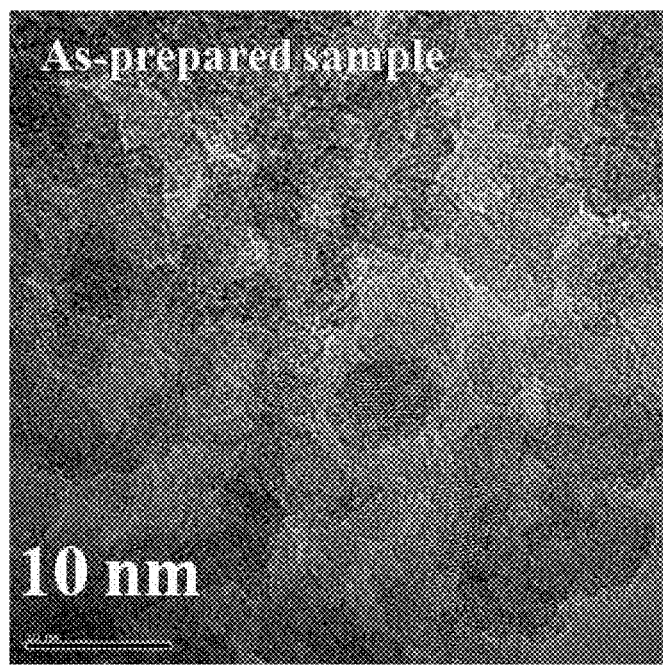
FIG. 2 is the magnified field emission-TEM image of dry $Li_4Ti_5O_{12}$ prepared by a solvothermal synthesis process.
Figure 3:
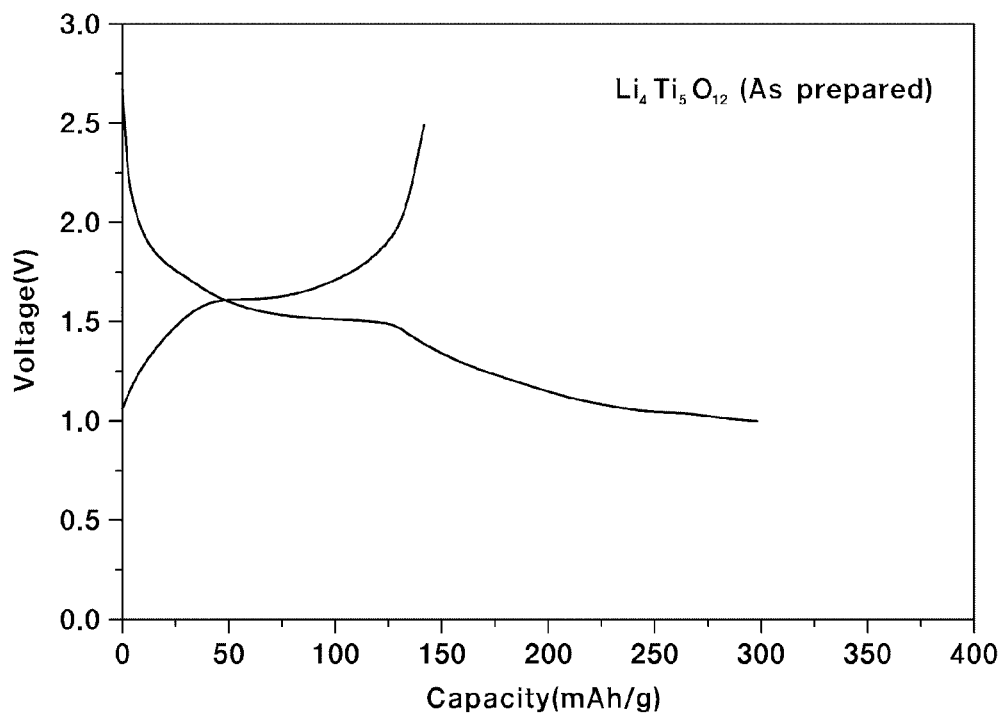
FIGS. 3 and 4 are graphs showing the initial charging and discharging curves and high rate capability characteristics of a half cell fabricated using $Li_4Ti_5O_{12}$ which is an anode material for a lithium secondary battery of the present invention, respectively.

According to other certain exemplary embodiments, FIG. 2 is the magnified field emission-TEM image of dry $Li_4Ti_5O_{12}$. Preferably, the $Li_4Ti_5O_{12}$ by solvothermal process without heat treatment maintains a suitably high crystallinity with an average size of 5~7 nm.

According to preferred exemplary embodiments, FIG. 1 and show that cubic system $Li_4Ti_5O_{12}$ spinel having high crystallinity and corresponding to the space group "Fd-3m" was synthesized without any further heat treatment.

Figure 4:
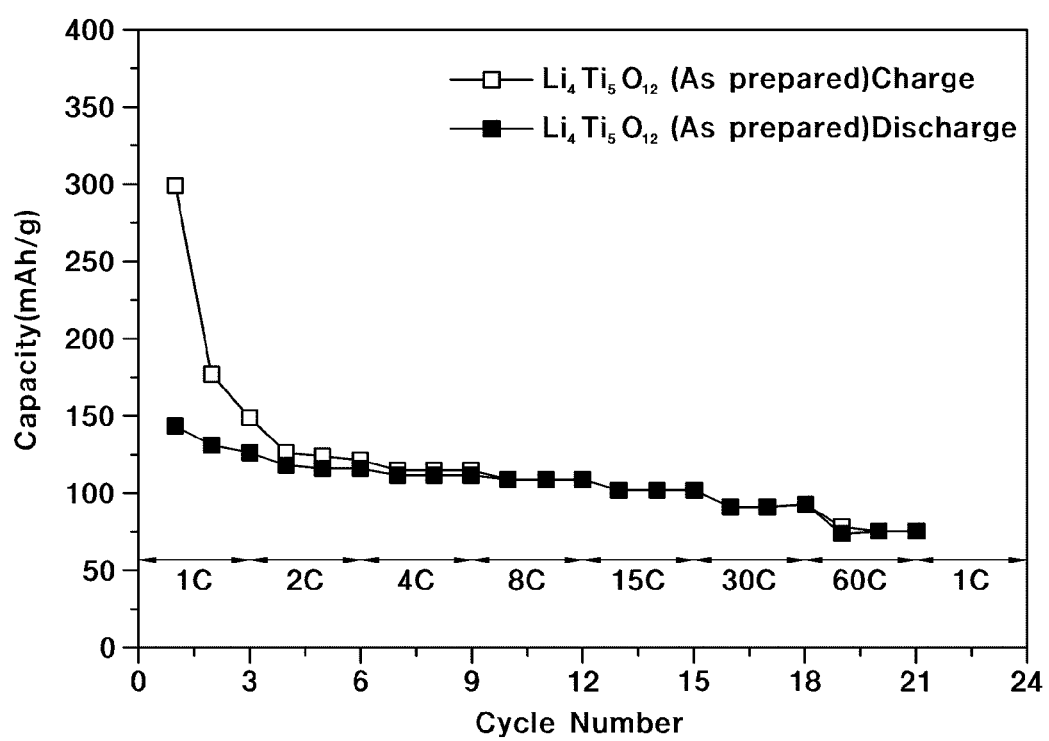

In other exemplary embodiments, for example, FIGS. 3 and 4 show the initial charging and discharging curves and high rate capability characteristics of a half cell fabricated using the $Li_4Ti_5O_{12}$ prepared by a solvothermal synthesis process. Preferably, as shown in FIGS. 3 and 4, it can be seen that the initial discharging capacity of the $Li_4Ti_5O_{12}$ is suitably maintained at about 300 mAh/g higher than a theoretical discharging capacity of 175 mAh/g, and the discharging capacity thereof at 60 C in a charging-discharging cycle is maintained at about 75 mAh/g, thus maintaining excellent discharging capacity. Preferably, the reason for this is determined that the nanostructured $Li_4Ti_5O_{12}$ having high crystallinity at lower temperature is suitably formed by a solvothermal synthesis process, so that the migration path of lithium is relatively shortened, thereby exhibiting excellent high rate capability characteristics.

In further exemplary embodiments, and as other test examples, the nanostructured $Li_4Ti_5O_{12}$ synthesized by a solvothermal synthesis process and $Li_4Ti_5O_{12}$ synthesized by a conventional solid reaction process (Comparative Example: Korean Patent Application No. 10-2007-47810, incorporated by reference in its entirety herein) and $Li_4Ti_5O_{12}$ synthesized by a conventional polyol process (Comparative Example: Korean Patent Registration No. 10-0795982, incorporated by reference in its entirety herein) were fabricated into their respective secondary batteries, and the electrical characteristics thereof were compared with each other.

Accordingly, the electrical characteristics of a secondary battery fabricated using 47% of the active material ($Li_4Ti_5O_{12}$) synthesized by a solvothermal synthesis process, 20% of a conducting agent and 33% of PTFE, the electrical characteristics of a secondary battery fabricated using 80% of the active material ($Li_4Ti_5O_{12}$) (Comparative Example) synthesized by a solid reaction process, 8% of a conducting agent and 12% of PVDF, and the electrical characteristics of a secondary battery fabricated using 47% of the active material ($Li_4Ti_5O_{12}$) (Comparative Example) which was synthesized by a polyol process and was then not heat-treated, 20% of a binder and 33% of PTFE were compared with each other. The results thereof are shown in FIG. 5.

Figure 5A:
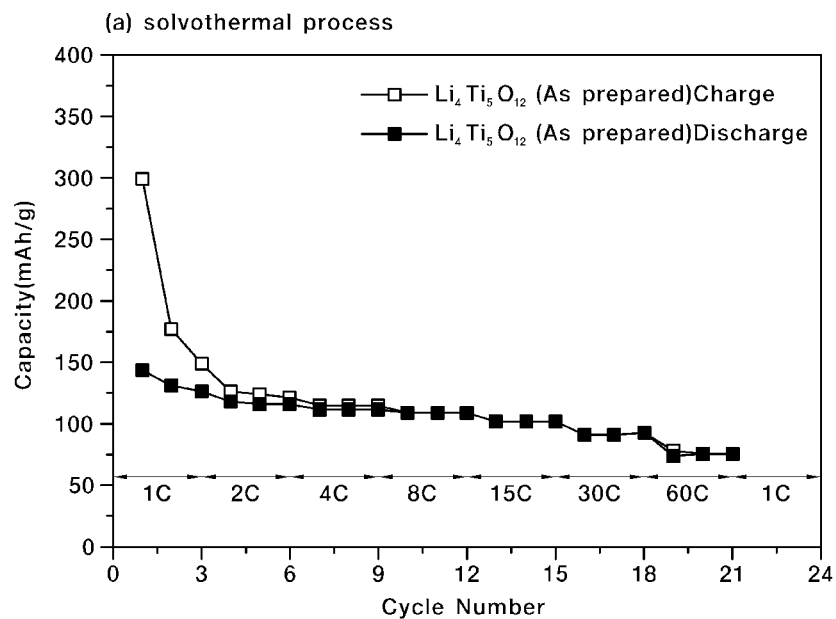
FIG. 5A is a graph showing an electrochemical characteristic of an exemplary secondary batter fabricated by an ezemplary solvothermal synthesis process using $Li_4Ti_5O_{12}$ as an anode material for a lithium secondary battery according to an exemplary embodiment of the present inventory.
Figure 5B:
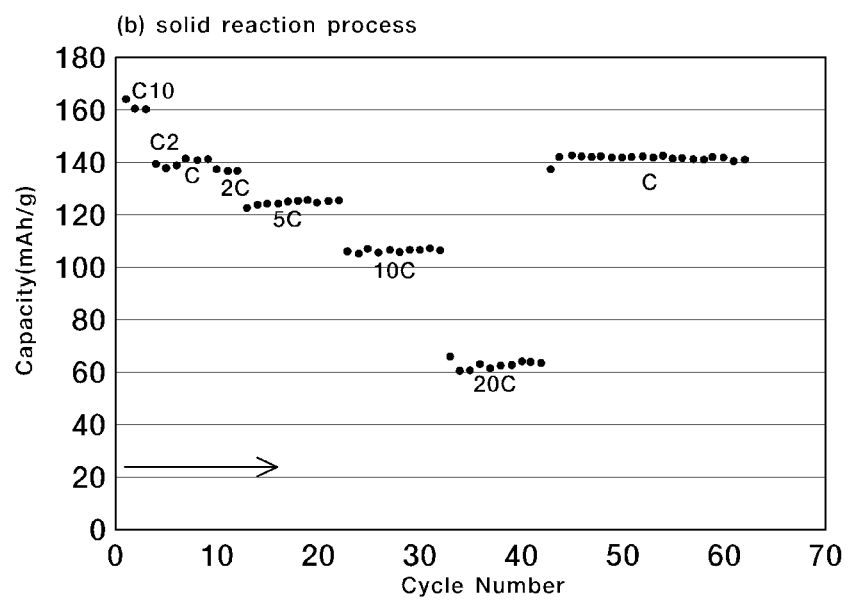
FIG. 5B is a graph showing an electrochemical characteristic of a conventional secondary batter fabricated by a conventional solid reaction process in the related art.

Comparing the high rate capability characteristics of the $Li_4Ti_5O_{12}$ synthesized by a solvothermal synthesis process according to the present invention as shown in FIG. 5A with those of the $Li_4Ti_5O_{12}$ synthesized by a conventional solid reaction process as shown in FIG. 5B, it can be seen that the $Li_4Ti_5O_{12}$ synthesized by a solvothermal synthesis process according to the present invention has a reversible charging-discharging capacity of about 75 mAh/g at 60 C in a charging-discharging cycle, whereas the $Li_4Ti_5O_{12}$ synthesized by a conventional solid reaction process has a discharging capacity of about 70 mAh/g at 20 C in a charging-discharging cycle.

Figure 5C:
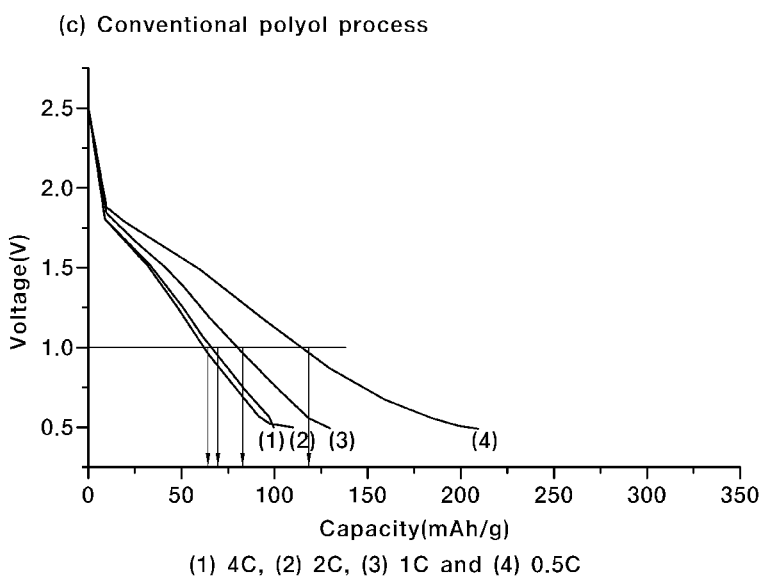
FIG. 5C is a graph showing an electrochemical characteristic of a conventional secondary batter fabricated by a conventional polyol process in the related art.

Further, comparing the high rate capability characteristics of the $Li_4Ti_5O_{12}$ synthesized by a solvothermal synthesis process according to the present invention as shown in FIG. 5A with those of the $Li_4Ti_5O_{12}$ synthesized by a conventional polyol process as shown in FIG. 5C, it can be seen that the $Li_4Ti_5O_{12}$ synthesized by a solvothermal synthesis process according to the present invention has a reversible discharging capacity of about 110 mAh/g at 4 C in a charging-discharging cycle, whereas the $Li_4Ti_5O_{12}$ synthesized by a conventional polyol process has a discharging capacity of about 100 mAh/g, which is slightly lower than that of the $Li_4Ti_5O_{12}$ synthesized by a solvothermal synthesis.

Accordingly, it can be seen that the high rate capability characteristics of the $Li_4Ti_5O_{12}$ synthesized by a solvothermal synthesis process according to preferred embodiments of the present invention are improved compared to those of the $Li_4Ti_5O_{12}$ synthesized by a conventional solid reaction process or a conventional polyol process. Further, it can be seen that the high-crystallinity $Li_4Ti_5O_{12}$ nanoparticles have improved electrochemical characteristics because nanoparticles having high crystallinity can be suitably obtained at lower temperatures due to pressure variables attributable to the boiling of a solvent during a solvothermal synthesis process.

According to certain preferred embodiments, the present invention offers, but is not limited to, the following advantages.

According to preferred embodiments of the present invention, $Li_4Ti_5O_{12}$ nanoparticles for a secondary battery exhibiting excellent crystallinity and high rate capability compared to those synthesized using the conventional polyol process or solid reaction process can be suitably obtained by converting $Li_4Ti_5O_{12}$, which is an anode active material for lithium secondary batteries, into $Li_4Ti_5O_{12}$ having a high crystalline nanostructure using a solvothermal synthesis process without performing additional heat treatment.

In particular preferred embodiments, according to the present invention, even when a mixed solution in which a titanium compound and a lithium compound are suitably dissolved in a polyol solvent is put into a SUS reaction vessel lined with teflon and then reacted at a predetermined temperature, the mixed solution can be suitably reacted at a temperature much higher than the predetermined temperature, so that $Li_4Ti_5O_{12}$ particles having a nanocrystalline structure can be suitably obtained without performing additional heat treatment after the reaction.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of preparing a high-capacity anode material for a rapidly chargeable and dischargeable lithium secondary battery using a solvothermal synthesis process, comprising the steps of:

mixing a titanium compound and a lithium compound with only a polyol solvent without inclusion of water to form a mixed solution (step 1);

putting the mixed solution into a reaction vessel lined with polytetrafluoroethylene (PTFE) (step 2) and then reacting the mixed solution at a predetermined temperature to produce a lithium-titanium oxide precipitate (step 3), wherein the predetermined temperature is in a range of 220 to 235° C. during the step 3; and washing (step 4), filtering (step 5) and then drying (step 6) at 120° C. the lithium-titanium oxide precipitate produced in the reaction vessel to obtain $Li_4Ti_5O_{12}$ nanoparticles having a nanocrystalline structure, wherein the $Li_4Ti_5O_{12}$ nanoparticles having the nanocrystalline structure are obtained without additional heat treatment after the drying, wherein the $Li_4Ti_5O_{12}$ nanoparticles correspond to a cubic system $Li_4Ti_5O_{12}$ spinel having crystallinity and correspond to a space group Fd-3m, wherein the $Li_4Ti_5O_{12}$ nanoparticles having the nanocrystalline structure are used as an anode material.

2. The method according to claim 1, wherein, in step 1, the mixed solution is formed by dissolving 0.01 mol of LiOH as a lithium compound in 25 mL of diethyleneglycol (DEG) as a polyol solvent to form a LiOH solution, adding 0.0125 mol of titanium tetra-isopropoxide (TTIP) as a titanium compound to the LiOH solution, and then stirring the LiOH solution for 30 minutes.

3. The method according to claim 1, wherein, in step 2, the mixed solution formed in step 1 is put into the reaction vessel lined with the polytetrafluoroethylene (PTFE) and then sealed, and then the sealed reaction vessel is put into a drying machine to heat and react the mixed solution for 12 to 24 hours in the sealed reaction vessel.

4. The method according to claim 1, wherein, in step 4, the lithium-titanium oxide precipitate is washed with acetone and methanol 3 to 4 times, filtered by a ceramic membrane, and then dried using a vacuum dryer at 120° C.

5. The method according to claim 1, wherein the titanium compound is titanium tetra-isopropoxide (TTIP) or titanium chloride (TiCl).

6. The method according to claim 1, wherein the polyol solvent is any one selected from the group consisting of ethylene glycol (EG), diethylene glycol (DEG), triethylene glycol (TEG) and tetraethylene glycol (TTEG).

7. The method according to claim 1, wherein the lithium compound is $Li_2O_2$ or $CH_3COOLi$.

8. A method of preparing a high-capacity anode material for a rapidly chargeable and dischargeable lithium secondary battery using a solvothermal synthesis process, comprising the steps of:

forming a mixed solution consisting of one or more titanium compounds, one or more lithium compounds, and one or more polyol solvents without inclusion of water (step 1);

putting the mixed solution into a reaction vessel lined with polytetrafluoroethylene (PTFE) (step 2) and then reacting the mixed solution at a predetermined temperature to produce a lithium-titanium oxide precipitate (step 3), wherein the predetermined temperature is in the range of 220 to 235° C. during the step 3; and washing (step 4), filtering (step 5) and then drying (step 6) at 120° C. the lithium-titanium oxide precipitate produced in the reaction vessel to obtain $Li_4Ti_5O_{12}$ nanoparticles having a nanocrystalline structure, wherein the $Li_4Ti_5O_{12}$ nanoparticles having the nanocrystalline structure are obtained without performing additional heat treatment after the drying, wherein the $Li_4Ti_5O_{12}$ nanoparticles correspond to a cubic system $Li_4Ti_5O_{12}$ spinel having crystallinity and correspond to a space group Fd-3m, wherein the $Li_4Ti_5O_{12}$ nanoparticles having the nanocrystalline structure are used as an anode material.

\* \* \* \* \*